United States Patent [19]

Lin

[11] 4,219,766
[45] Aug. 26, 1980

[54] HYBRID DUAL MODE SERVO-SYSTEM

[75] Inventor: Frank W. Lin, San Jose, Calif.

[73] Assignee: Qume Corporation, San Jose, Calif.

[21] Appl. No.: 890,051

[22] Filed: Mar. 27, 1978

[51] Int. Cl.² .............................................. G05B 11/18
[52] U.S. Cl. .................................. 318/594; 318/592; 318/603; 318/692
[58] Field of Search ............... 318/594, 692, 603, 592

[56] References Cited

U.S. PATENT DOCUMENTS

| | | | |
|---|---|---|---|
| 3,736,485 | 5/1973 | Scarrott et al. | 318/594 |
| 3,739,158 | 6/1973 | Woodward | 318/615 |
| 3,828,168 | 8/1974 | O'Callaghan | 318/603 |
| 3,976,929 | 8/1976 | Rodier | 318/594 |
| 4,006,394 | 2/1977 | Cuda et al. | 318/594 |
| 4,021,714 | 5/1977 | Jones et al. | 318/594 |
| 4,031,443 | 6/1977 | Droux | 318/617 X |

*Primary Examiner*—B. Dobeck
*Attorney, Agent, or Firm*—Thomas E. Kristofferson

[57] ABSTRACT

A dual mode servo-system providing improved motion characteristics and improved noise immunity. A relatively movable member is driven by control signals derived from actual velocity feedback signals during coarse mode operation. At the beginning of fine mode operation the actual velocity signal is sampled and used to generate a synthetic velocity signal used to control motion of the member during final deceleration, along with an actual position feedback signal, the synthetic velocity signal having a decreasing magnitude tailored to a particular application. At a predetermined maximum time period, after detent of the member, a time out circuit re-inserts the actual velocity feedback signal.

Control signals for the driven member are also derived from the actual motor current by integrating the motor current, the integrated current signals being used to control motion of the member during coarse mode operation only. During fine mode operation, the member is controlled by an actual position feedback signal and an actual velocity signal derived from the position signal.

21 Claims, 5 Drawing Figures

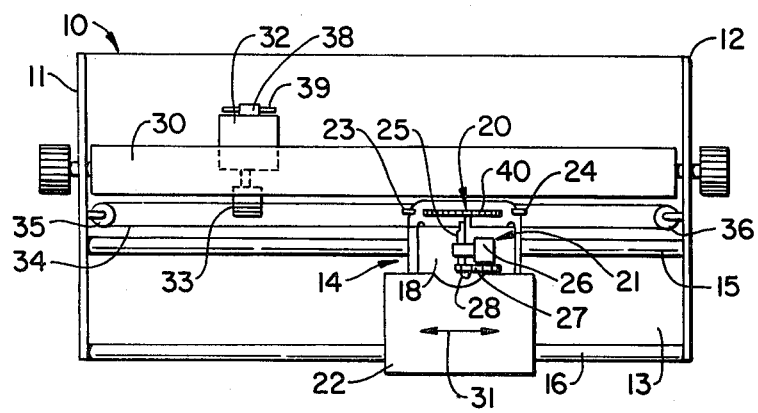
FIG._1.
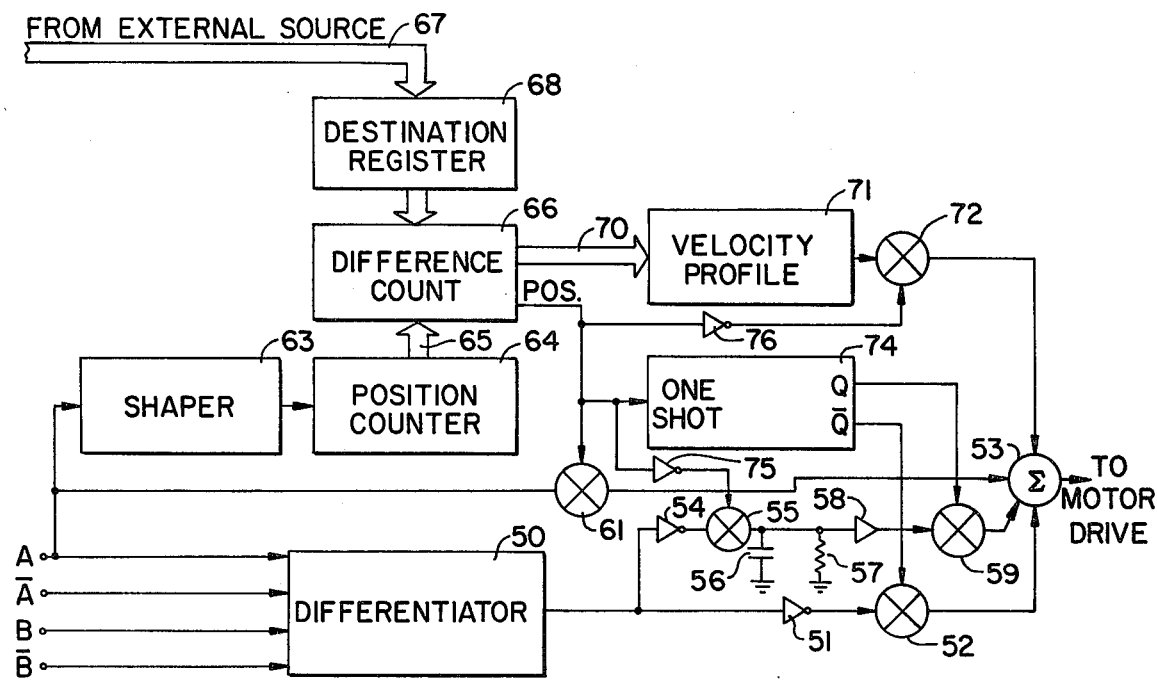
FIG._2.
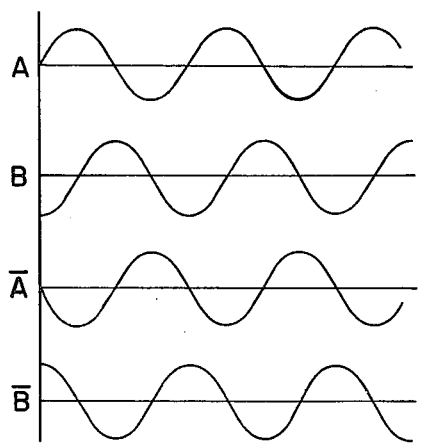
FIG._3.

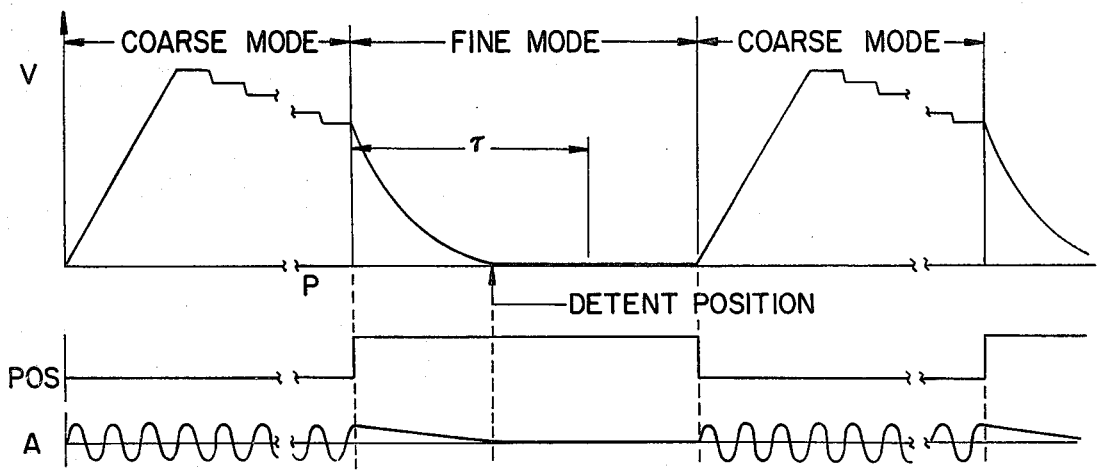
FIG._4.
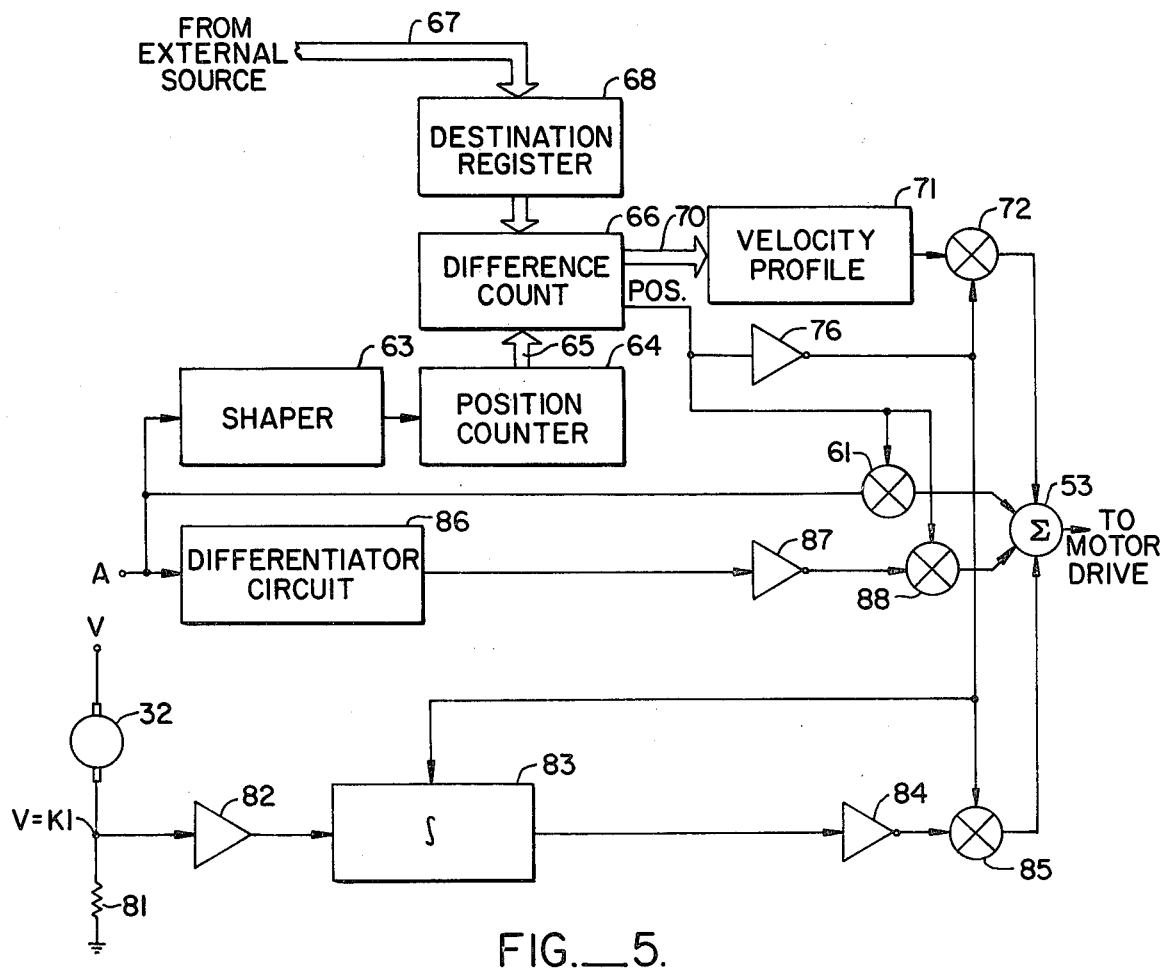
FIG._5.

HYBRID DUAL MODE SERVO-SYSTEM

BACKGROUND OF THE INVENTION

This invention relates to servo control systems of the type used to control the motion of a movable member along a path from a starting point to a destination over repeated cycles of movement. More particularly, this invention relates to servo control systems of the dual mode type.

Dual mode servo-systems are known and have been employed in the past to control the motion of a relatively movably member, such as a read/write transducer carriage assembly in a rotating disc drive unit, a rotatable printing member such as a cylindrical type element or a daisy wheel print element, a translatable carriage in a daisy wheel printer and other objects capable of being electromechanically driven. Dual mode servos are so termed since the control circuitry operates in two different modes of operation during a motion cycle, with the paired modes being variously called coarse and fine, non-linear and linear, velocity and position, and other designations used by those skilled in the art. Essentially, in one mode of operation the motion of the driven member is controlled in accordance with the instantaneous velocity of the member provided by a feedback signal from an appropriate transducer mechanism coupled to the member until the driven member is within a final portion of the motion path close to the desired destination. When the final portion of the motion path is entered, the control circuitry switches to the alternate mode of operation in which a linear position signal also generated by an appropriate transducer coupled to the member is added to the control feedback circuitry as the member approaches its final destination. Once the destination is reached, the alternate mode of operation is maintained so that the driven member is stabilized over the destination position. When a new destination is called for, typically by supplying a destination information signal to the control circuitry electronics, the dual mode servo switches back to the first mode of operation and is controlled in accordance with the velocity signals until the motion path portion is entered, whereupon the control circuitry switches in the linear position signal and the servo circuit is again operated in the alternate mode. This dual mode of operation is cyclically repeated as subsequent destination information signals are presented to the system.

In nearly all known dual mode servo-systems, the desired objective is to quickly move the driven member from the starting position to a position closely adjacent the final destination position and then to home in to the destination position in a more precise fashion. The former is accomplished during the mode of operation termed coarse, velocity or non-linear, while the latter is accomplished during the second mode of operation termed fine, position or linear. During the first mode of operation, the driven member is quickly accelerated to the maximum design velocity and then the velocity of the member is reduced typically in a step-by-step manner by comparing the actual velocity of the driven member with a predetermined velocity profile generated by a control circuit and controlling the electrical power applied to the electrical drive motor in accordance with the difference between the magnitudes of these two signals. The velocity profile is typically determined in advance and usually comprises a velocity step function whose magnitude is dependent upon the distance of the member from the actual destination. In addition, the velocity step function usually diminishes with decreasing distance between the instantaneous position of the member and the specified destination.

When the servo circuitry is switched to the fine mode, the desired velocity profile either falls to zero or is switched completely out of the control circuitry so that the motion of the member is controlled along the final path portion by a signal which is the algebraic difference between the actual velocity signal and the actual position signal, the latter typically being a sinusoidal or triangular signal designed to be substantially linear when the member is close to the destination position.

As noted above, the actual velocity and position signals, which are representative of the actual instantaneous velocity and actual instantaneous position of the driven member, are typically generated by transducers which are mechanically coupled to the driven member and which are capable of generating electrical signals representative of or proportional to the actual velocity and actual position of the driven member. Many types of such transducers are known: In some applications, separate transducers are employed to generate the velocity signals and the position signals. For example, a tachometer mechanically linked to the motor drive shaft is typically used to generate the velocity feedback signal; while an optoelectronic position transducer consisting of one or more light sources and a corresponding number of light receptors, a fixed reference aperture and a movable grating having alternating translucent and opaque indicia, is typically used to generate the position signals. In other applications, the actual velocity signals are derived from the position signals, either by differentiating a single cyclic analog position signal, or by commutating a plurality of space phased cyclic position signals and differentiating the commutated segments thereof.

Known dual mode servo-systems of the above-noted type have been found to suffer from several disadvantages when employed in certain applications requiring precise positioning of the driven member in the shortest possible period of time between the beginning and the end of a motion cycle. For example, in many dual mode servo-systems, the driven member will overshoot the destination position during fine mode operation and will describe dampened oscillatory motion about the destination position. Given a sufficiently long period of time, the driven member will be electronically stabilized over the destination position: However, in some applications such as printing applications in which the servo is used to control the position and motion of a rotatable print element the desideratum is to stop the motion of the driven member as quickly as possible, perform a function (e.g., printing) whose successful operation is dependent upon stabilization of the driven member, and proceed with the next motion cycle as quickly as possible. For example, in an application in which the servo circuitry is used to control the rotation of a daisy wheel, the design criteria employed for the printing control circuitry must allow for print wheel settling time during which the print wheel is describing damped oscillatory motion about the detent or destination position. It the allowed maximum settling time is selected to be too small, the print wheel will still be describing motion of sufficient amplitude to cause a blurred character to be printed; on the other hand, if the settling time is selected to be too long, the character printing speed will be inherently slow, which is highly undesirable. Although empirical adjustments can be made to the servo circuitry to reduce the amount of overshoot and also the settling time, the fact that the control signals are derived from the actual velocity and position of the print wheel are a limiting factor in minimizing overshoot and settling time.

Another disadvantage inherent in many known prior art dual mode servo-systems is that of electrical noise generated in various portions of the system. For example, in those servo-systems in which the velocity signals are derived from the position signals, noise signals are generated by the commutation and differentiation circuitry, which signals introduce signal errors into the circuitry with the result that the electrical signals which are intended to be truly representative of the actual instantaneous velocity of the driven member contain errors. Since the velocity signals deviate from the true velocity of the driven member, which errors cannot be accurately predicted and thus compensated for, and since these velocity signals are compared with the desired velocity profile signals to produce control voltages for driving the motor used to power the driven member, the driven member is not operated in accordance with the true design criteria of the system, as a consequence of which system performance suffers.

SUMMARY OF THE INVENTION

The invention comprises a dual mode servo system in which overshoot and settling time errors are minimized, and actual velocity errors are eliminated.

According to a first aspect of the invention designed to reduce overshoot and minimize settling time of the driven member, control signals are generated for an electric motor used to power a driven member in accordance with the actual velocity of the driven member during a first portion of the motion path of the member and in accordance with the instantaneous position signal and a synthetic velocity signal during the final portion of the motion path. The synthetic velocity signal is generated by a resistance-capacitance network from the value of the actual velocity signal at the instant that the servo system is switched from the coarse to the fine mode of operation. The actual velocity signal is coupled to the resistance-capacitance network by means of a switch which is maintained conductive during the coarse mode of operation when the driven member is moving along the first path portion. When the servo system is switched from coarse to fine mode, this switch is rendered non-conductive to isolate the resistance-capacitance network from the actual velocity signal so that the value stored in the resistance-capacitance network at the beginning of the final path portion is representative of the velocity of the driven object at that instant. Thereafter, the synthetic velocity signal decays exponentially in accordance with the time constant of the network and thus independently of the actual motion of the driven member.

In another aspect of the invention designed to eliminate the injection of erroneous noise signals into the servo circuitry during the coarse mode of operation, control signals for the electrical motor are derived from the actual current flowing through the electrical motor by integrating the current signal and comparing this signal with a desired current signal generated in accordance with the difference between the actual position of the driven member and the desired destination to be reached. During coarse mode of operation, no velocity signals are coupled to the servo control circuitry and no velocity signals are derived from position signals and used to generate the motor control signals, thus eliminating a first source of noise signals commonly present in known devices. In addition, the integrator circuit used to supply to control feedback signals during coarse mode of operation functions as a low pass electrical filter which sharply attenuates any spurious noise signals which might be present in the input circuitry. When the servo system is switched to the fine mode of operation at the beginning of the final path portion, the motor control signals are obtained from an instantaneous position feedback signal and an actual velocity signal. For a fuller understanding of the nature and the advantages of the invention, reference should be had to the ensuing detailed description taken in conjunction with the accompanying drawings.

BRIEF DESCRIPTION OF THE DRAWINGS

FIG. 1 is a schematic top plan view of a rotary printer embodying the invention;

FIG. 2 is a block diagram illustrating a first embodiment of the invention;

FIG. 3 is a waveform diagram illustrating the position input signals of FIG. 2;

FIG. 4 is a waveform diagram illustrating the operation of the invention of FIG. 2; and FIG. 5 is a block diagram of an alternate embodiment of the invention.

DESCRIPTION OF THE PREFERRED EMBODIMENTS

Turning now to the drawings, FIG. 1 illustrates a rotary printer embodying the invention. As seen in this Fig., the printer 10 has a pair of end walls 11, 12 and a base 13 for housing the electrical and mechanical components of the invention. A carriage assembly 14 is slidingly supported on a pair of support rods 15, 16 extending laterally between sidewalls 11, 12. Carriage assembly 14 includes a base plate 18 which provides support for a rotary print wheel drive assembly generally designated by reference numeral 20, a print hammer solenoid assembly 21, an ink ribbon cartridge 22, a cartridge drive apparatus (not shown), and a pair of ink ribbon guides 23, 24.

Print hammer solenoid assembly 21 includes a translatable hammer 25, a solenoid 26, a pivotable hammer striking arm 27 and a hammer rebound stop 28.

Ink ribbon cartridge 22 may be a cartridge of the type disclosed in U.S. Pat. No. 4,053,042 issued Oct. 11, 1977 for "Endless Ribbon Cartridge", employing a cartridge drive apparatus of the type shown in U.S. Pat. No. 3,967,790 issued July 6, 1976 for "Cartridge Drive Apparatus".

A conventional platen 30 is rotatably secured to end walls 11, 12 rearwardly of carriage assembly 14 and is preferably provided with a manual-automatic feed mechanism of the type disclosed in U.S. Pat. No. 3,880,016 issued Apr. 29, 1975 for "Variable Displacement Apparatus For Platen and Tractor Feed".

Carriage assembly 14 is translated in the opposite directions indicated by arrow 31 by means of a reversible DC motor 32 secured to base 13 and having a sheave 33 mounted on the drive shaft thereof. Rotational motion of sheave 33 is converted to translational movement of carriage assembly 14 by means of a drive cable 34 which is wrapped about sheave 33, received about a pair of pulleys 35, 36 secured to end walls 11, 12, respectively, and secured to base plate 18 of carriage assembly 14.

In operation, actuation of DC motor 32 with signals of a first polarity or phase causes rotation of sheave 33 in a first direction which in turn results in the translation of carriage assembly 14 in a first direction by cable 34. Application of signals of opposite polarity or phase to DC motor 32 causes rotation of sheave 33 in the opposite direction resulting in translation of carriage assembly 14 in the opposite direction by cable 34.

Rotary print wheel drive assembly 20 is shown and described in commonly assigned U.S. Patent Application Ser. No. 700,654 filed June 28, 1976 now U.S. Pat. No. 4,118,129 for "Rotary Wheel Printing System", the disclosure of which is hereby incorporated by reference. Briefly described, rotary print wheel drive assembly 20 comprises a daisy print wheel 40 mounted to one end of a drive shaft of a DC motor similar to motor 32, the print wheel 40 having a plurality of radially extending spokes each terminating in an enlarged character path portion arranged to be impressed against a printing medium by means of hammer 25 when solenoid 26 is actuated by appropriate electronic control circuitry. Rotary print wheel drive assembly 20 further includes a transducer secured to the motor drive shaft capable of generating cyclical analog position signals of the type shown in FIG. 3 as the daisy wheel 40 is rotated about the axis of the motor.

Carriage drive motor 32 includes a transducer assembly comprising a housing 38 containing a light source and light sensor and an encoding disc 39 mounted for rotation with the shaft of motor 32, as shown and described in the above referenced copending commonly assigned patent application.

FIG. 2 illustrates a first embodiment of the invention for use in controlling the motion of either print wheel 40 or carriage assembly 14. As seen in this Fig., cyclic analog position signals A, $\overline{A}$, B, $\overline{B}$ are supplied to separate inputs of the differentiator circuit 50 of known design and capable of generating instantaneous velocity signals from the signals input thereto, from either the carriage transducer components 38, 39 or the print wheel transducer components (not shown). As seen in FIG. 3, the input signals A, B, $\overline{A}$, $\overline{B}$ are four space phased analog cyclic position signals mutually separated by a phase difference of 90°. Signal $\overline{A}$ may be obtained from signal A by simply inverting the latter. Signal $\overline{B}$ may be similarly obtained.

The output of differentiator 50 is coupled via an inverting amplifier 51 to the transfer input of a switch 52 having a transfer output coupled to one terminal of a summing network 53. The output of differentiator circuit 50 is also coupled via an inverting amplifier 54 to the transfer input terminal of a switch 55 having a transfer output terminal coupled to a resistance-capacitance network comprising capacitor 56 and resistor 57. The capacitance-resistance network is coupled via an amplifier 58 to the transfer input terminal of a switch 59 having a transfer output coupled to an input of summing network 53.

Position signal A is coupled to the transfer input terminal of a switch 61 having a transfer output terminal coupled to an input of summing network 53. Position signal A is also coupled to the input of a shaper circuit 63 of known design used to convert position signal A to a pulse train for incrementing a position counter 64. Position counter 64 may be any one of a number of known devices capable of tracking the instantaneous position of the carriage assembly 14 or the print wheel 40 in terms of unit increments of distance, either linear or angular, and is typically a multi-bit digital counter having state outputs specifying the count configuration.

The state outputs of position counter 64 are coupled via bus 65 to one set of information inputs of a difference count unit 66. Difference count unit 66 may be of conventional design, such as a multi-bit digital adder.

A destination information signal from an external source, such as a keyboard or associated computer, is coupled via bus 67 to a destination register 68, preferably a multi-bit digital register settable to states corresponding to the digital information character presented to the inputs thereof. Once placed in destination register 68, the destination character remains set therein until the end of a motion cycle, and is continuously supplied to the remaining set of input terminals of difference count unit 66. The difference between the digital characters in position counter 64 and destination register 68 is developed by difference count unit 66 and supplied via bus 70 to a velocity profile unit 71. Velocity profile unit 71 is a known device capable of generating a velocity profile of appropriate shape, preferably the decreasingly stepped function illustrated in FIG. 4, and consisting of successive plateaus of decreasing magnitude with decreasing distance of the carriage or print wheel from the destination identified by the character in destination register 68. The output of velocity profile unit 71 is coupled to the transfer input terminal of a switch 72 having a transfer output terminal coupled to an input terminal of summing network 53.

Summing network 53 is coupled to appropriate motor drive circuitry of known construction and used to drive the carriage or print wheel.

The conductive states of switches 52, 55, 59, 61, and 72, which are preferably electrical switches of the field effect transistor type, are controlled by a logic signal termed POS for position (see FIG. 4) both directly and indirectly by means of a one shot circuit 74. One shot circuit 74 is a conventional circuit responsive to a positive going transition of POS logic signal and having a time out period $\tau$ greater than the time constant of the capacitance-resistance network 56, 57. The POS logic signal is generated by the difference count unit 66 whenever the difference between the values in destination register 68 and position counter 64 reaches a predetermined minimum value specifying that point along the motion path of the carriage or print wheel at which the servo circuit is to be switched from the coarse mode of operation to the fine mode of operation.

In operation, when a destination character is supplied to destination register 68 which differs from the value stored in position counter 64, the POS logic signal changes to a level in which switch 61 is non-conductive, which isolates position Signal A from summing network 53. The POS logic signal is inverted by inverters 75, 76 to render switches 55 and 72 conductive. One shot circuit 74 initially is in the quiescent state in which the Q output maintains switch 59 non-conductive and the $\overline{Q}$ output maintains switch 52 conductive. During this set of conditions, defining the coarse mode of operation of the FIG. 2 embodiment, the input signals to the summing network 53 comprise the velocity generated by the differentiator 50 (via gate 52) and the desired velocity signal generated by velocity profile unit in response to the difference count present on bus 70, the desired velocity signal being supplied to summing network 53 via conductive switch 72. As the driven member (either the carriage or the print wheel) progresses along this first portion of the motion path, the position counter 64 is continuously incremented by the pulses generated by shaper 63, and after an initial period of rapid acceleration of the driven member, the velocity profile unit 71 successively reduces the desired velocity signal supplied to summing network 53 in accordance with the stepped profile shown in FIG. 4. Thus, as the driven member approaches its destination, the desired velocity signal is reduced, which results in a corresponding reduction in the actual velocity. In addition, during coarse mode of operation the actual velocity signals produced by differentiator 50 are coupled via amplifier 54 and switch 55 to capacitor 56 which closely tracks the magnitude of the actual velocity signal.

Once the driven member has approached the destination by the predetermined amount, the POS logic signal changes to the opposite level which renders switches 55 and 72 non-conductive, thereby isolating capacitor 56 from differentiator 50 and terminating the application of the desired velocity signals from velocity profile unit 71 to summing network 53. In addition, one shot 74 changes state to render switch 52 non-conductive, thereby terminating the application of the actual velocity signals from differentiator 50 to summing network 53, and renders switch 59 conductive, which couples the voltage on capacitor 56 to summing network 53. In addition, when POS logic signal changes state, switch 61 is rendered conductive thereby coupling position signal A to summing network 53.

With the servo system now in fine mode of operation, further motion of the driven member is controlled by position signal A and the voltage on capacitor 56, the latter decaying in accordance with the time constant of the network comprising capacitor 56 and resistor 57 in the manner illustrated in FIG. 4 in the position mode region from the boundary to the point termed the detent position. During this portion of the motion cycle, the motion of the driven member is thus isolated from the actual velocity of the member and controlled in accordance with the synthetic velocity signal provided by capacitor 56 and resistor 57. By selecting an appropriate value for resistor 57, the driven member can be brought to the detent position in an optimum manner. The actual value of resistor 57 can best be selected in an empirical manner using appropriate measuring instruments, such as an oscilloscope, to observe the motion of the driven member, and adjusting the value of resistor 57 until the optimum motion characteristics are achieved.

After the driven member has achieved the detent position, auxiliary operations, such as printing of the in-place type element are performed, which typically require a greater period of time than that portion of the period $\tau$ of one shot circuit 74 remaining after the driven member has reached the detent position. It should be noted that, once the driven member has reached the detent position, only the position signal A is inserted into the servo loop, i.e., the motion of the driven member is under control of the position signal A only. Since the driven member is only stable for a finite period of time when under control of the position feedback signal only, the period $\tau$ of one shot 74 should be selected in such a manner that one shot 74 returns to the quiescent state before the driven member achieves any oscillatory motion of intolerable amplitude. For example, in a FIG. 2 embodiment designed for use with a 96 spoke daisy print wheel in a rotary printer, the period of one shot 74 was selected to be 1.2 msec. However, the actual value of $\tau$ is dependent upon the particular application to which the FIG. 2 embodiment is applied.

After one shot 74 times out, switch 52 is rendered conductive, thereby inserting any actual velocity signals generated by differentiator 51 into the servo loop; and switch 59 is rendered non-conductive, thereby disconnecting capacitor 56 from the servo loop. Position signal A remains inserted into the loop via switch 61 held in the conductive state by POS logic signal and velocity profile unit 71 remains disconnected from the servo loop by maintaining switch 72 in the non-conductive state with the inverse of POS logic signal.

When a subsequent destination character is supplied to destination register 68 which differs from the value stored in position counter 64, the coarse mode of operation is re-initiated, and this mode proceeds as described above.

FIG. 5 shows an alternate embodiment of the invention specifically directed to the second aspect of the invention noted above:, viz., immunity from electrical noise present in prior art systems. As seen in this Fig., a voltage proportional to the current through carriage drive motor 32 is developed across a resistor 81 and supplied via an amplifier 82 to an integrator 83. The output of integrator 83 is passed through inverting amplifier 84 to the transfer input terminal of a switch 85 having a transfer output terminal coupled to summing network 53.

Position signal A is coupled to the input of a differentiator circuit 86, which generates a signal representative of the actual velocity of the driven member. The output of differentiator 86 is coupled via inverting amplifier 87 to the transfer input terminal of a switch 88 having a transfer output terminal coupled to summing network 53. Position signal A is also coupled to the transfer input terminal of switch 61 having a transfer output terminal coupled to summing network 53.

Elements 63–68, and 70–72 function in a manner identical to that described above with reference to FIG. 2.

In operation, at the beginning of the coarse mode the POS logic signal is at a level at which switches 61 and 88 are rendered non-conductive to isolate the position signal and the time derivative thereof from summing network 53, while switches 72 and 85 are rendered conductive by the inverse of the POS signal. The velocity profile signal from unit 71 is algebraically subtracted from the integrated current signal from integrator 83 and inverter 84 by means of summing network 53 and supplied to the motor driver circuitry. When the POS level signal changes state, switches 72 and 85 are rendered non-conductive, thereby isolating summing network 53 from the profile unit 71 signal and the inverted integrated current signal, and switches 61 and 88 are rendered conductive to couple the position signal A and the time derivative thereof, inverted by inverter 87, to summing network 53. Since only single phase A is differentiated to generate the actual velocity feedback signal, no phase selection switching is necessary which eliminates noise transients into the servo loop.

During the coarse mode of operation, the output of differentiator circuit 86 is isolated from summing network 53 to eliminate any adverse effects of electrical noise transients, while any noise transients present at the output of amplifier 82 in the motor current feedback portion of the servo loop are filtered by integrator 83. During the fine mode of operation, integrator 83 is initialized by the inversion of the POS logic signal so that subsequent entry into the coarse mode of operation always begins with integrator 83 in the same initial condition.

It should be noted that only one position signal is required to provide the requisite position feedback information for the servo circuitry in the FIG. 5 embodiment. As a consequence, an extremely simple position transducer assembly may be employed for this embodiment, with a resulting reduction in cost and complexity of the mechanical and electrical components required. Further, while the two aspects of the invention have been described with respect to separate independent systems, both aspects may be combined in a single system. Thus, for example, the synthetic signal injection technique of the FIG. 2 embodiment may be employed in the FIG. 5 system to monitor the actual integrated motor current during coarse mode of operation and to provide a synthetic current signal during the fine mode of operation.

As will now be apparent, servo systems fabricated in accordance with the teachings of the invention can be tailored to individual application requirements to provide optimal motion characteristics by the simple expedient of changing the value of the capacitance-resistance network. In addition, the use of the integrated current feedback signal during the coarse mode of operation eliminates several potential noise sources from the operational circuitry and thus provides a servo system which is more accurate and stable in operation than known prior systems. Further, the invention may be applied to a wide variety of servo applications using readily available component circuitry.

While the above provides a full and complete disclosure of the invention, various modifications, alternate constructions and equivalents may be employed without departing from the true spirit and scope of the invention. For example, while the alternate embodiments have been described in conjunction with a rotary printer of the daisy wheel type, the principles of the invention may be applied to other electromechanical devices, such as rotating disc memory units. Therefore, with a rotary printer of the daisy wheel type, the principles of the invention may be applied to other electromechanical devices, such as rotating disc memory units. Therefore, the above description and illustrations should not be construed as limiting the scope of the invention, which is defined by the appended claims.

What is claimed is:

1. Apparatus for controlling the motion of a movable member along a path from a starting position to a destination position, said apparatus comprising:
    means for generating a signal representative of the instantaneous position of said movable member;
    means for generating a signal representative of the instantaneous velocity of said movable member;
    means for generating a synthetic velocity signal from said instantaneous velocity signal during a predetermined final portion of said path, and
    control means coupled to said position signal generating means, said synthetic velocity signal generating means and said velocity signal generating means for controlling the motion of said movable member in accordance with said instantaneous velocity signal during a given portion of said path and in accordance with said position signal and said synthetic velocity signal during said first portion of said path.

2. The combination of claim 1 wherein said instantaneous velocity signal generating means includes means for generating said instantaneous velocity signal from said instantaneous position signal.

3. The combination of claim 1 wherein said instantaneous position signal comprises a cyclic analog position signal.

4. The combination of claim 1 wherein said instantaneous position signal comprises at least two space phased cyclic analog position signals.

5. The combination of claim 1 wherein said synthetic velocity signal generating means comprises means for storing the value of said instantaneous velocity signal at the initial portion of said final path portion, and means for altering said stored value in a predetermined manner.

6. The combination of claim 5 wherein said storing means comprises a capacitor and said altering means comprises a resistor.

7. The combination of claim 5 further including cycle means for generating a signal delineating said first path portion and said final path portion, and further including switching means having an input coupled to said instantaneous velocity signal generating means, an output coupled to said storing means, and a control terminal coupled to said cycle means, said switching means being conditioned by said cycle means to a first state during said first path portion in which said instantaneous velocity signal is coupled to said storing means and to a second state during said final path portion in which said instantaneous velocity signal is isolated from said storing means at the start of said final path portion.

8. The combination of claim 7 wherein said control means further includes timing means coupled to said cycle means for maintaining said switching means in said second state for a predetermined maximum time period and conditioning said switching means to said first state at the end of said maximum time period.

9. The combination of claim 1 wherein said movable member comprises a rotatable printwheel means.

10. The combination of claim 1 wherein said movable member comprises a translatable carriage means.

11. A servo-system for controlling the motion of a movable member along a path from an initial position to a destination position, said member being powered by a motor means, said servo-system comprising:
    first means having an input adapted to be coupled to a source of signals representative of the instantaneous velocity of said movable member for generating a synthetic velocity signal;
    second means adapted to be coupled to a destination information signal and a position signal representative of the instantaneous position of said movable member for generating a desired velocity signal and
    control means coupled to said first and second means and adapted to be coupled to the source of said instantaneous position signal for generating control signals for said motor means in accordance with said desired velocity signal and said instantaneous velocity signal during a given portion of said path and in accordance with said synthetic velocity signal and said instantaneous position signal during a final portion of said path.

12. The combination of claim 11 wherein said first means comprises means for storing the value of said instantaneous velocity signal at the beginning of said final path portion and means for altering said value in a predetermined manner.

13. The combination of claim 12 wherein said storing means comprises a capacitor and said altering means comprises a resistor.

14. The combination of claim 11 wherein said second means includes a destination storage means, an instantaneous position storage means, means for generating a signal representative of the difference between the values in said destination storage means and said instantaneous position storage means, and means responsive to said difference signal for generating said desired velocity signal.

15. The combination of claim 14 wherein said instantaneous position storage means includes an incrementable counter and means adapted to be coupled to said instantaneous position signal for incrementing said counter as said member is moved each unit distance of motion along said path.

16. The combination of claim 11 wherein said control means includes summing means having an output adapted to be coupled to said motor means, first switch means having a desired velocity signal input coupled to said second means, an output coupled to said summing means and a control input terminal; second switch means having an input terminal adapted to be coupled to said instantaneous position signal, an output terminal coupled to said summing means and a control input terminal; and cycle means for delineating said first path portion and said final path portion; said control input terminal of said first and second switch means being coupled to said cycle means so that said first switch means is conditioned to a first state during said first path portion in which said desired velocity signal is coupled to said summing means and to a second state during said final path portion in which said desired velocity signal is isolated from said summing means and said second switch means is conditioned to a first state during said first path position in which the signal present at the input terminal thereof is isolated from said summing means and to a second state during said final path portion in which the signal present at the input terminal thereof is coupled to said summing means.

17. The combination of claim 16 wherein said control means further includes third switch means having an input coupled to said first means, an output coupled to said summing means and a control input terminal; and fourth switch means having an input adapted to be coupled to said source of signals representative of the instantaneous velocity of said movable member, an output coupling said summing means and a control input terminal; said control input terminal of said third and fourth switch means being coupled to said cycle means so that said fourth switch means is conditioned to a first state during said first path portion in which the signal present at the input terminal thereof is coupled to said summing junction and to a second state during said final path portion in which the signal present at the input terminal thereof is isolated from said summing means and said third switch means is conditioned to a first state during said first path portion in which said synthetic velocity signal is isolated from said summing means and to a second state during said final path portion in which said synthetic velocity signal is coupled to said summing means.

18. The combination of claim 17 wherein said control means further includes timing means having an input coupled to said cycle means for maintaining said third and fourth switch means in said second state during said final path portion for a predetermined maximum time period and for conditioning said third and fourth switch means to said first state at the end of said maximum time period.

19. The combination of claim 18 wherein said timing means comprises a monostable multi-vibrator having complementary outputs coupled respectively to said control terminal of said third and fourth switch means.

20. The combination of claim 11 wherein said movable member comprises a rotatable print wheel means.

21. The combination of claim 11 wherein said movable member comprises a translatable carriage means.

* * * * *